United States Patent
Smoke et al.

(10) Patent No.: US 8,408,446 B1
(45) Date of Patent: Apr. 2, 2013

(54) METHODS AND TOOLING ASSEMBLIES FOR THE MANUFACTURE OF METALLURGICALLY-CONSOLIDATED TURBINE ENGINE COMPONENTS

(75) Inventors: Jason Smoke, Phoenix, AZ (US); David K. Jan, Fountain Hills, AZ (US); Don Mittendorf, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/371,922

(22) Filed: Feb. 13, 2012

(51) Int. Cl.
*B23K 20/00* (2006.01)
*B21K 25/00* (2006.01)

(52) U.S. Cl. ............ 228/193; 228/194; 228/234.1; 228/245; 29/889.2

(58) Field of Classification Search .................. None
See application file for complete search history.

(56) References Cited

U.S. PATENT DOCUMENTS

| | | | |
|---|---|---|---|
| 2,579,583 A * | 12/1951 | Johnson .................. 29/889.21 |
| 2,625,365 A * | 1/1953 | Moore ..................... 416/186 R |
| 2,799,473 A * | 7/1957 | Smith et al. .................. 415/137 |
| 3,999,030 A | 12/1976 | Nakazaki et al. |
| 4,417,381 A | 11/1983 | Higginbotham |
| 4,447,188 A | 5/1984 | Davis et al. |
| 4,529,452 A | 7/1985 | Walker |
| 4,538,331 A | 9/1985 | Egan et al. |
| 4,587,700 A | 5/1986 | Curbishley et al. |
| 4,659,288 A | 4/1987 | Clark et al. |
| 5,113,583 A * | 5/1992 | Jenkel et al. ............... 29/889.21 |
| 5,192,190 A | 3/1993 | Ferleger et al. |
| 5,318,406 A | 6/1994 | Bardes |
| 5,735,046 A * | 4/1998 | Frasier et al. ............... 29/889.2 |
| 6,325,871 B1 | 12/2001 | Burke et al. |
| 6,331,217 B1 | 12/2001 | Burke et al. |
| 6,666,653 B1 * | 12/2003 | Carrier ................... 416/213 R |
| 6,805,535 B2 | 10/2004 | Tiemann |
| 6,814,544 B2 | 11/2004 | Tsukamoto et al. |
| 6,969,240 B2 | 11/2005 | Strangman |
| 7,441,331 B2 | 10/2008 | Hudson et al. |
| 7,584,538 B2 | 9/2009 | Lee |
| 7,669,326 B2 | 3/2010 | Jeutter et al. |
| 7,841,083 B2 | 11/2010 | Alaux et al. |
| 8,015,705 B2 | 9/2011 | Wilson, Jr. et al. |
| 8,061,989 B1 | 11/2011 | Liang |
| 8,206,117 B2 * | 6/2012 | Strangman et al. ....... 416/219 R |
| 2005/0000091 A1 * | 1/2005 | Ockborn et al. ........... 29/889.23 |
| 2008/0068016 A1 * | 3/2008 | Gaddipati et al. ............ 324/318 |
| 2008/0107531 A1 * | 5/2008 | Chou et al. .................. 416/213 R |
| 2008/0107532 A1 * | 5/2008 | Carrier et al. ............. 416/213 R |
| 2008/0107533 A1 * | 5/2008 | Carrier et al. ............. 416/213 R |
| 2009/0119919 A1 * | 5/2009 | Kington et al. .............. 29/889.7 |
| 2010/0150725 A1 * | 6/2010 | Krautheim ................ 416/219 R |

(Continued)

FOREIGN PATENT DOCUMENTS

GB 755841 8/1956
GB 929960 6/1963

*Primary Examiner* — Kiley Stoner
(74) *Attorney, Agent, or Firm* — Ingrassia Fisher & Lorenz, P.C.

(57) ABSTRACT

Embodiments of a method for manufacturing a turbine engine component are provided, as are embodiments of a thermal growth constraint tool for the manufacture of turbine engine components. In one embodiment, the method includes the steps of obtaining a plurality of arched pieces, arranging the plurality of arched pieces in a ring formation, and bonding the plurality of arched pieces together to produce a monolithic ring by heating the ring formation to a predetermined bonding temperature while constraining the outward radial growth thereof.

20 Claims, 10 Drawing Sheets

U.S. PATENT DOCUMENTS

2010/0284817 A1* 11/2010 Bamberg et al. .......... 416/241 R
2011/0219616 A1* 9/2011 Bayer et al. ................. 29/889.1
2012/0090175 A1* 4/2012 Schmidt ...................... 29/889.7

* cited by examiner

METHODS AND TOOLING ASSEMBLIES FOR THE MANUFACTURE OF METALLURGICALLY-CONSOLIDATED TURBINE ENGINE COMPONENTS

TECHNICAL FIELD

The present invention relates generally to gas turbine engines and, more particularly, to methods and tooling assemblies utilized in the manufacture of turbine engine components including, but not limited to, turbine rotors, compressor rotors, and turbine nozzle rings.

BACKGROUND

Gas turbine engines ("GTE") have been engineered extensively to improve efficiency, thrust-to-weight ratios, and other measures of engine performance. One of the most direct manners by which engine performance can be improved is through increases in the core rotational speeds and turbine inlet temperatures generated during engine operation. However, as turbine inlet temperatures and rotational speeds increase, so too do the thermal and mechanical demands placed on the GTE components. The most demanding performance requirements are typically placed on the high pressure turbine rotor or rotors, which are positioned immediately downstream of the GTE combustion section and which rotate at the greatest speed during engine operation. The turbine blades, in particular, are directly exposed to combustive gas flow at or near peak temperatures and are consequently heated to exceedingly high temperatures at which most alloys weaken or melt and become prone to oxidation or other forms of chemical degradation. By comparison, the inner portion of the turbine (commonly referred to as the "turbine disk") is largely shielded from direct exposure to combustive gas flow, but is subject to considerable mechanical stressors resulting from the centrifugal forces acting on the turbine rotor at high rotational speeds.

Considering the variance in operating conditions across the turbine rotor, it is desirable to produce the turbine blades from a first alloy having good mechanical strength and oxidation resistance at highly elevated temperatures, while the turbine disk is fabricated from a second alloy having exceptionally high mechanical strength properties (e.g., high stress rupture strength and fatigue resistance) at lower operational temperatures. In one manufacturing technique for producing a dual alloy turbine rotor, the turbine disk and individual turbine blades are separately fabricated as individual pieces; e.g., the turbine disk may be forged and machined, while each turbine blade may be separately cast and machined. The turbine blades are fabricated to include enlarged base portions or shanks, which are inserted into mating slots provided around the outer circumference of the turbine disk. The shanks and mating slots are formed to have an interlocking geometry (e.g., a so-called "fir tree" interface), which prevents disengagement of the shanks in a radial direction during high speed rotation of the rotor.

While enabling fabrication of the turbine blades and the rotor disk from disparate alloys, the above-described manufacturing technique is limited in several respects. The formation of the geometrically complex mating blade interface between the shanks and the turbine disk slots often requires multiple precision machining steps, which add undesired expense, time, and complexity to the manufacturing process. In addition, the mating interface between the shanks and the turbine disk can be difficult to seal and may permit undesired leakage across the turbine rotor during engine operation. As a still further limitation, the formation of such a mating interface between the shanks and the turbine disk may necessitate an increase in the overall size and weight of the multi-piece turbine rotor to achieve a structural integrity comparable to that of a single-piece or monolithic turbine rotor.

It is thus desirable to provide embodiments of a method for the manufacture of turbine rotor enabling the turbine blades to be joined to a separately-fabricated rotor disk in a manner that overcomes the above-noted limitations; e.g., in a manner that reduces the cost and complexity of manufacturing, that reduces leakage across the turbine rotor, and that allows a reduction in the overall size and weight of the turbine rotor. Ideally, embodiments of a such a manufacturing method could also be utilized in the production other types of turbine engine components, such as compressor rotors, static turbine nozzle assemblies, seal plates, and engine frame structures. Finally, it would be desirable to provide embodiments of specialized tooling suitable for usage in such manufacturing processes. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of a method for manufacturing a turbine engine component are provided. In one embodiment, the method includes the steps of obtaining a plurality of arched pieces, arranging the plurality of arched pieces in a ring formation, and bonding the plurality of arched pieces together to produce a monolithic ring by heating the ring formation to a predetermined bonding temperature while constraining the outward radial growth thereof.

Embodiments of a thermal growth constraint tool are further provided for producing a monolithic ring from a plurality of arched pieces arranged into a ring formation. In one embodiment, the thermal growth constraint tool includes first and second thermal growth constraint rings sized and shaped to be positioned around the ring formation. Spacer members axially space the first and second thermal growth constraint rings to form an annular void into which the airfoils of the ring formation extend when the thermal growth constraint tool is positioned around the ring formation.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

The following describes embodiments for manufacturing turbine engine components wherein a plurality of discrete, arched pieces are inter-bonded or arch-bonded utilizing a directed thermal growth bonding process to yield a metallurgically-consolidated, monolithic ring. Embodiments of the manufacturing process described herein are especially well-suited in the production of annular engine components including a number or circumferentially-spaced airfoils, such as turbine rotors, compressor rotors, and turbine nozzle rings. For example, when utilized to produce a turbine rotor, embodiments of the manufacturing process can be utilized to inter-bond a number of individually-fabricated bladed pieces to produce a monolithic bladed ring, which can subsequently be bonded onto a separately-fabricated rotor disk. Advantageously, bonding a unitary or monolithic bladed ring to a rotor disk yields a more robust mechanical attachment than does individually joining a number of discrete turbine blades to a turbine rotor via an insert-type mating interface of the type described in the foregoing section entitled "BACKGROUND." Bonding a monolithic bladed ring onto a separately-fabricated rotor disk also generally allows for a reduction in the overall size and mass of the completed turbine rotor. As a still further advantage, bonding a monolithic ring of blades onto a separately-fabricated turbine rotor minimizes or eliminates the formation of leakage paths across the turbine rotor body and, consequently, improves overall rotor performance.

Figure 1:
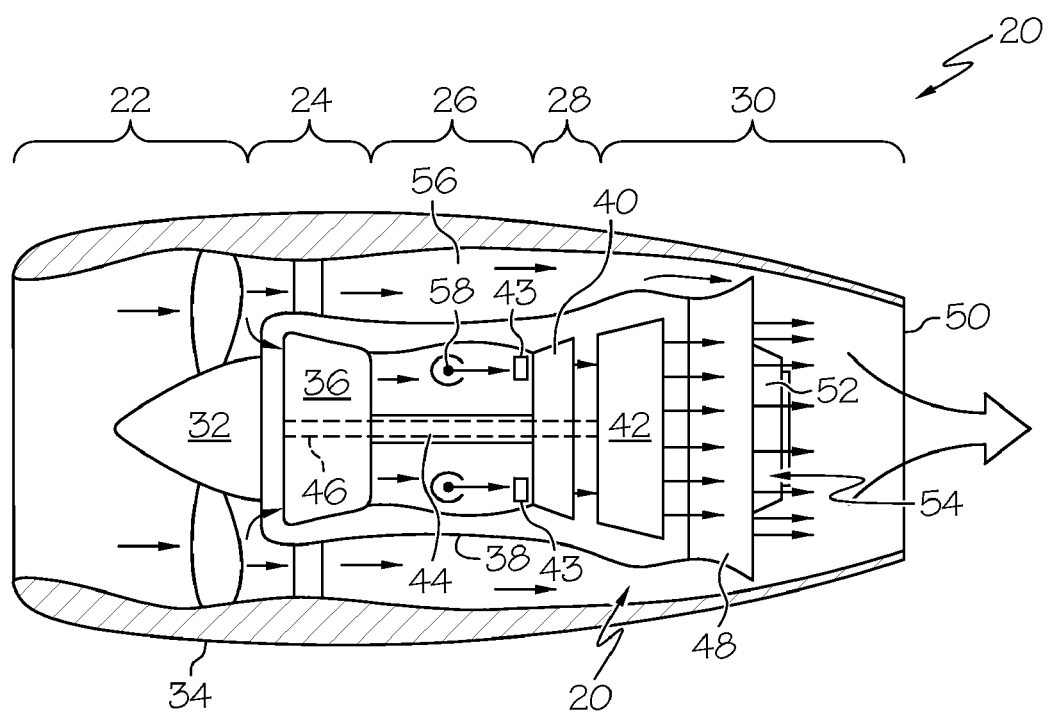
FIG. 1 is a schematic illustrating an exemplary gas turbine engine including a turbine section.

FIG. 1 is a simplified cross-sectional view of a gas turbine engine (GTE) 20 illustrated in accordance with an exemplary embodiment of the present invention. By way example, GTE 20 is illustrated in FIG. 1 as a two spool turbofan engine including an intake section 22, a compressor section 24, a combustion section 26, a turbine section 28, and an exhaust section 30. Intake section 22 includes an intake fan 32 mounted in a nacelle assembly 34. In the illustrated example, compressor section 24 includes a single compressor 36, which is rotatably disposed within an engine case 38 mounted within nacelle assembly 34. Turbine section 28 includes a high pressure (HP) turbine 40 and a low pressure (LP) turbine 42, which are rotatably disposed within engine case 38 in flow series. A first non-rotating or static turbine nozzle ring 43 is disposed immediately upstream of HP turbine 40, and a second static stator nozzle ring (not shown) may likewise be disposed upstream of LP turbine 42. Compressor 36 and HP turbine 40 are mounted to opposing ends of an HP shaft 44, and intake fan 32 and LP turbine 42 are mounted to opposing ends of a LP shaft 46. LP shaft 46 and HP shaft 44 are co-axial; that is, LP shaft 46 extends through a longitudinal channel provided through HP shaft 44. Engine case 38 and nacelle assembly 34 terminate in a mixer nozzle 48 and a propulsion nozzle 50, respectively. Mixer nozzle 48 cooperates with a centerbody 52 to form an exhaust mixer 54, which mixes hot combustive gas flow received from turbine section 28 with cooler bypass airflow during operation of GTE 20.

As illustrated in FIG. 1 and described herein, GTE 20 is offered by way of example only. It will be readily appreciated that turbine rotors or other metallurgically-consolidated turbine engine components of the type described herein can be utilized within various other types of gas turbine engine including, but not limited to, other types of turbofan, turboprop, turboshaft, and turbojet engines, whether deployed onboard an aircraft, watercraft, or ground vehicle (e.g., a tank), included within an auxiliary power unit, included within industrial power generators, or utilized within another platform or application. With respect to exemplary GTE 20, in particular, it is noted that the particular structure of GTE 20 will inevitably vary amongst different embodiments. For example, in certain embodiments, GTE 20 may include an exposed intake fan (referred to as an "open rotor configuration") or may not include an intake fan. In other embodiments, GTE 20 may employ centrifugal compressors or impellers in addition to or in lieu of axial compressors. In still further embodiments, GTE 20 may include a single shaft or three or more shafts along with varying numbers of compressors and turbines.

During operation of GTE 20, air is drawn into intake section 22 and accelerated by intake fan 32. A portion of the accelerated air is directed through a bypass flow passage 56, which is provided between nacelle assembly 34 and engine case 38 and conducts this airflow over and around engine case 38. The remaining portion of air exhausted from intake fan 32 is directed into compressor section 36 and compressed by compressor 36 to raise the temperature and pressure of the core airflow. The hot, compressed airflow is supplied to combustion section 26 wherein the air is mixed with fuel and combusted utilizing one or more combustors 58 included within section 26. The combustive gasses expand rapidly and flow through turbine section 28 to rotate the turbine rotors of HP turbine 40 and LP turbine 42. Turbine nozzle ring 43 further accelerates the combustive gas flow and helps to impart the gas flow with a desired tangential component prior to reaching HP turbine 40. The rotation of turbines 40 and 42 drives the rotation of shafts 44 and 46, respectively, which, in turn, drives the rotation of compressor 36 and intake fan 32. The rotation of shafts 44 and 46 also provides significant power output, which may be utilized in a variety of different manners, depending upon whether GTE 20 assumes the form of a turbofan, turboprop, turboshaft, turbojet engine, or an auxiliary power unit, to list but a few examples. After flowing through turbine section 28, the combustive gas flow is then directed into exhaust section 30 wherein mixer 54 mixes the combustive gas flow with the cooler bypass air received from bypass flow passages 56. Finally, the combustive gas flow is exhausted from GTE 20 through propulsion nozzle 50.

Figure 2:
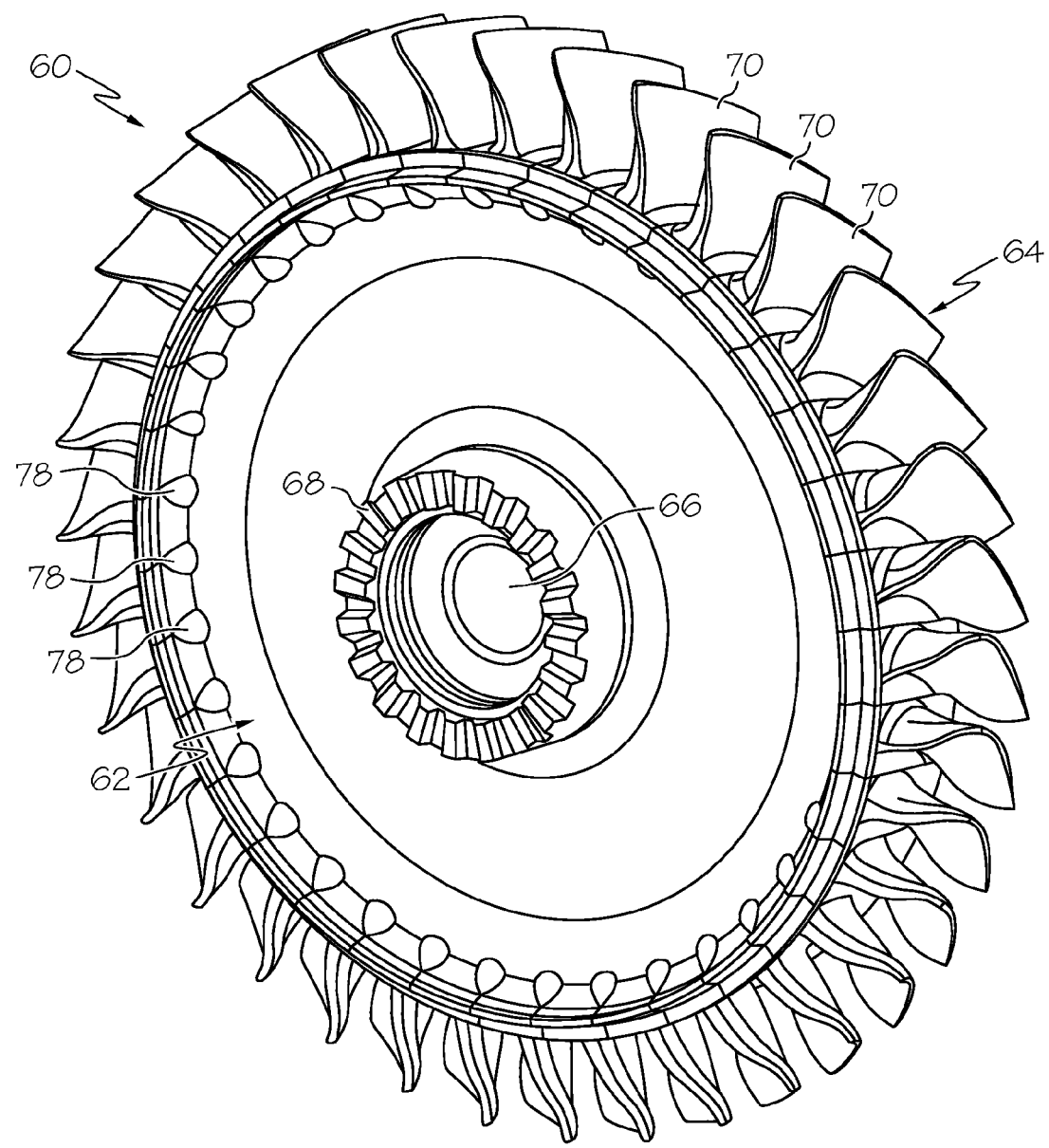
FIG. 2 is an isometric view of a turbine rotor produced in accordance with an exemplary embodiment of the present invention suitable for inclusion within a gas turbine engine, such as the gas turbine engine shown in FIG. 1.

FIG. 2 is an isometric view of a turbine rotor 60 produced in accordance with an exemplary embodiment of the present invention. Turbine rotor 60 includes an inner cylindrical portion or body 62 (referred to herein as "rotor disk 62") and an outer bladed ring 64, which circumscribes and is metallurgically bonded to rotor disk 62. Turbine rotor 60 can be utilized at any location or stage within the turbine section of a gas turbine engine; e.g., in the case of GTE 20 (FIG. 1), turbine rotor 60 may be utilized within either HP turbine 40 or LP turbine 42. However, in embodiments wherein the thermal and mechanical capabilities of rotor 60 are enhanced via fabrication of outer bladed ring 64 and rotor disk 62 from disparate materials, turbine rotor 60 is especially well-suited for usage within a high pressure turbine, such as HP turbine 40 included within GTE 20 (FIG. 1). An axial bore or central channel 66 is provided through the hub of rotor disk 62 to allow the passage of a shaft; e.g., in embodiments wherein turbine rotor 60 is utilized within HP turbine 40 of GTE 20 (FIG. 1), LP shaft 46 may extend through channel 66. As further indicated in FIG. 2, rotor disk 62 may be fabricated to include a castellated or toothed tubular protrusion 68, which interlocks or mates with a corresponding castellated or toothed member fixedly coupled to a high pressure shaft, such as HP shaft 44 (FIG. 1), to enable torque transmission to and from disk 62. Outer bladed ring 64 of turbine rotor 60 is comprised of a series of blade structures 70 (three of which are labeled in FIG. 2). Blade structures 70 are angularly spaced about the outer circumference of rotor disk 62 and, thus, about the rotational axis of turbine rotor 60 at substantially regular intervals; e.g., in the illustrated example wherein turbine rotor 60 includes thirty six structures 70, blade structures 70 may be circumferentially spaced about the rotor disk 62 at 10° intervals.

Figure 3:
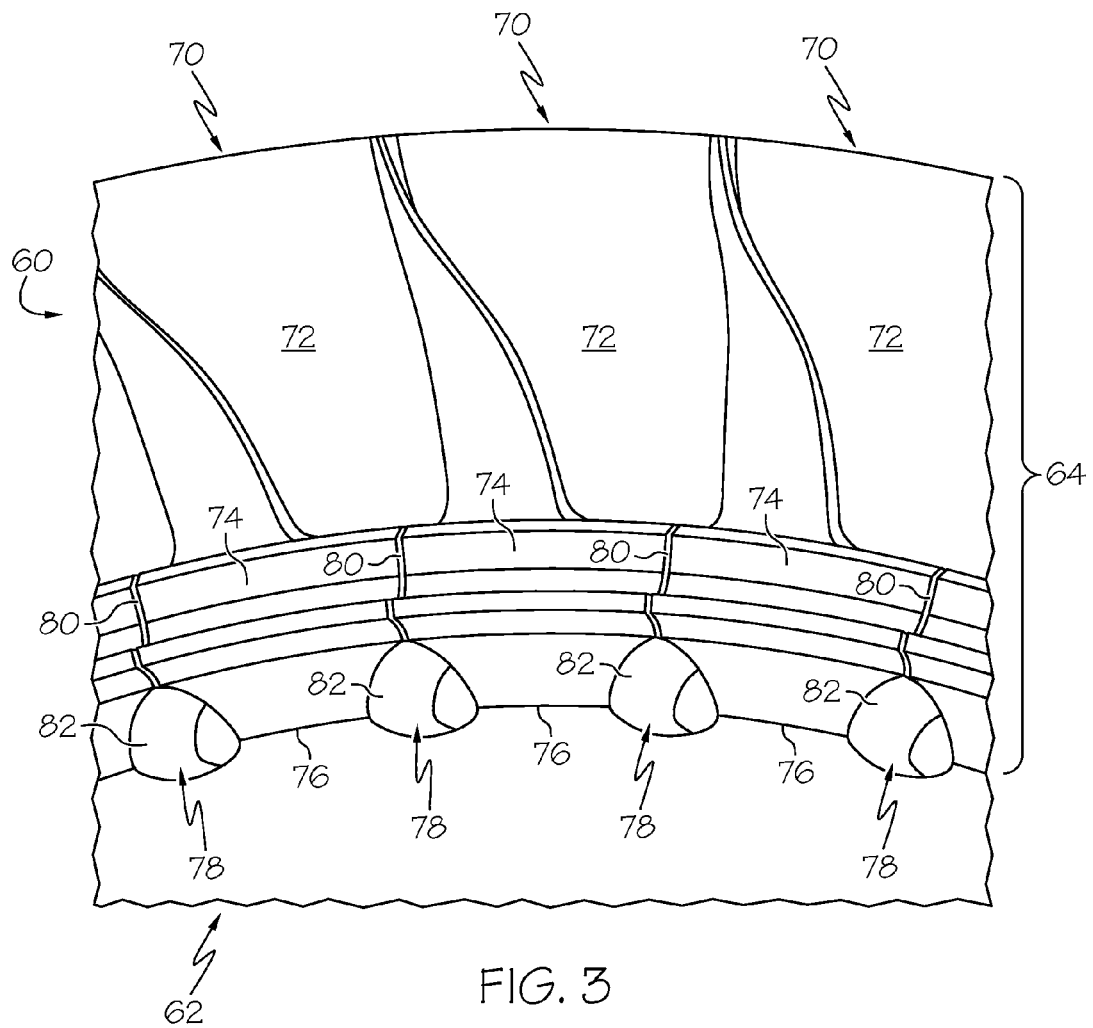
FIG. 3 is an isometric view of a portion of the turbine rotor shown in FIG. 2 illustrating, in greater detail, multiple inter-blade strain relief cut-outs that may be formed between the turbine blades.
Figure 4:
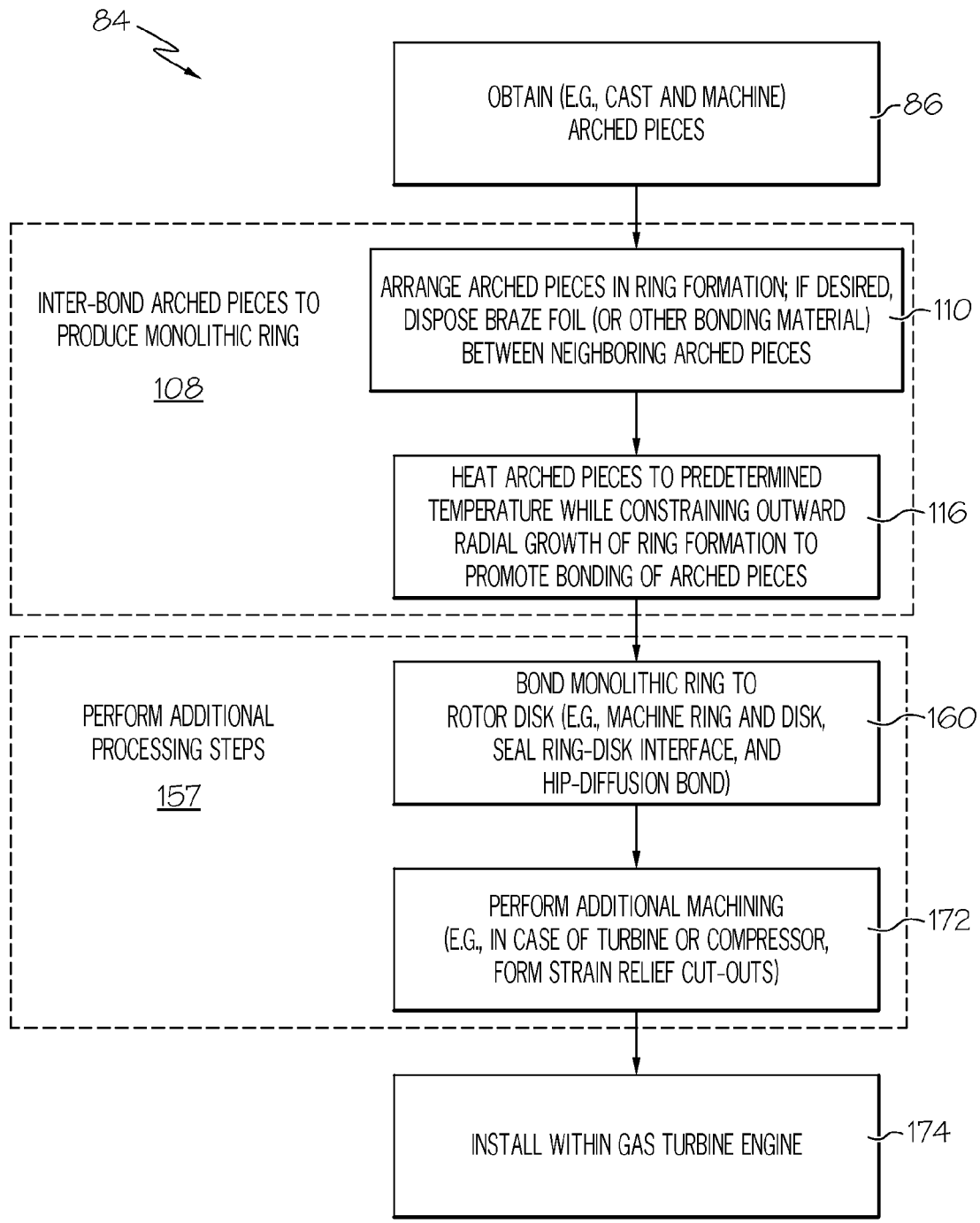
FIG. 4 is a flowchart illustrating an exemplary method for manufacturing a turbine engine component, such as the turbine rotor shown in FIGS. 2 and 3.

FIG. 3 illustrates three blade structures 70 of turbine rotor 60 in greater detail. As identified in FIG. 3, each blade structure 70 includes a blade or airfoil 72 and an enlarged base portion 74 (referred to herein as "shank 74"). Each airfoil 72 extends radially from its respective shank 74 and may be integrally formed therewith as a single piece by, for example, casting and machining. The inner radial surface or bottom of each shank 74 is bonded to the outer circumferential surface of rotor disk 62 along a bond line 76. Shanks 74 are preferably bonded to rotor disk 62 utilizing a hot isostatic bonding ("HIP") diffusion process, as described more fully below in conjunction with STEP 160 of exemplary method 84 (FIG. 4). In the exemplary embodiment shown in FIG. 3, turbine rotor 60 is fabricated to further include a plurality of strain relief features, namely, a series of inter-blade cut-outs 78. Each inter-blade cut-out 78 includes a radial slit 80, which is formed between two neighboring shanks 74. During high speed rotation of turbine rotor 60, slits 80 are formed within turbine rotor 60 to ease hoop stress within rotor 60 when subject to high temperatures and rotational speeds during engine operation. Radial slits 80 terminates in enlarged openings 82, which are formed through rotor 60 and imparted with substantially rounded (e.g., circular, elliptical, tear-shaped, etc.) geometries. Openings 82 are provided to distribute mechanical stressors more uniformly over a large surface area to reduce stress concentrations within rotor 60 during engine operation.

FIG. 4 is a flowchart illustrating an exemplary method 84 for manufacturing a turbine engine component in accordance with an exemplary embodiment of the present invention. For convenience of explanation, exemplary method 84 will be primarily described below in the manufacture of a metallurgically-consolidated ring of blades incorporated into a turbine rotor and, specifically, into turbine rotor 60. However, as previously indicated, exemplary method 84 can be utilized to produce various other types of turbine engine components having a generally annular or arcuate geometry, whether or not such turbine components include a plurality of circumferentially-spaced blades or vanes. A non-exhaustive list of turbine engine components that may be produced utilizing exemplary method 84 includes, but not limited to, turbine rotors (both radial and axial), compressor rotors (both radial and axial), static turbine nozzle rings, engine frame structures, and seal plates. The steps illustrated in FIG. 4 and described below are provided by way of example only; in alternative embodiments of method 84, additional steps may be performed, certain steps may be omitted, and/or the steps may be performed in alternative sequences.

Exemplary method 84 commences with the step of obtaining a plurality of arched pieces (STEP 86, FIG. 4). The arched pieces may be purchased from a supplier or independently fabricated by, for example, individually casting and machining each arched piece. As utilized herein, the term "arched piece" denotes any structural element or assemblage of structural elements at least a portion of which has a generally arc-shaped or curved geometry and which are able to be arranged in a partial or complete ring formation with a number of like arched pieces. In embodiments wherein method 84 is utilized to produce a turbine rotor or compressor, each arched pieces will typically include a wedge-shaped shank from which one or more turbine or compressor blades radially project. By comparison, in embodiments wherein method 84 is utilized to produce a turbine nozzle ring, the arched pieces may include inner and outer curved endwall segments between which one or more vanes extend. The arched pieces may assume various other geometries and may include various other structural features, as appropriate, in embodiments wherein method 84 is utilized to produce other types of turbine engine components, such as seal plates and engine frame structures.

The arched pieces are ideally fabricated from an oxidation-resistant material having good mechanical strength at high temperatures. In a preferred embodiment, each arched piece is cast from a single crystal superalloy having its crystallographic grain structure oriented to provide optimal mechanical strength in a radial direction. By way of non-limiting example, an oxidation-resistant, single crystal, nickel-based superalloy may be utilized, such as the nickel-based superalloy commercially identified as "CMSX 4." This notwithstanding, the arched pieces may be fabricated from other high temperature materials, as well, including equiaxed superalloys. Whether fabricated from a single crystal or an equiaxed alloy, the initial fabrication of a plurality of arched pieces, which are subsequently joined or consolidated into a monolithic ring utilizing a directed thermal growth bonding process of the type described bellow, provides several advantages as compared to single shot casting processes. By initially casting a plurality of individual arched pieces, any defective or otherwise unusable pieces can be identified prior to consolidation; consequently, scrap volume and cost can be greatly reduced as compared to a single shot casting process wherein any voiding, occlusions, or other defects may require rejection of the entire ring casting. In addition, casting can be typically be more reliably and precisely controlled for smaller volume pieces; thus, casting individual arched pieces generally allows for higher yields due to more reliable filling of the individual arched pieces and the production of arched pieces having relatively complex external and internal features, such as internal cooling passages.

Figure 5:
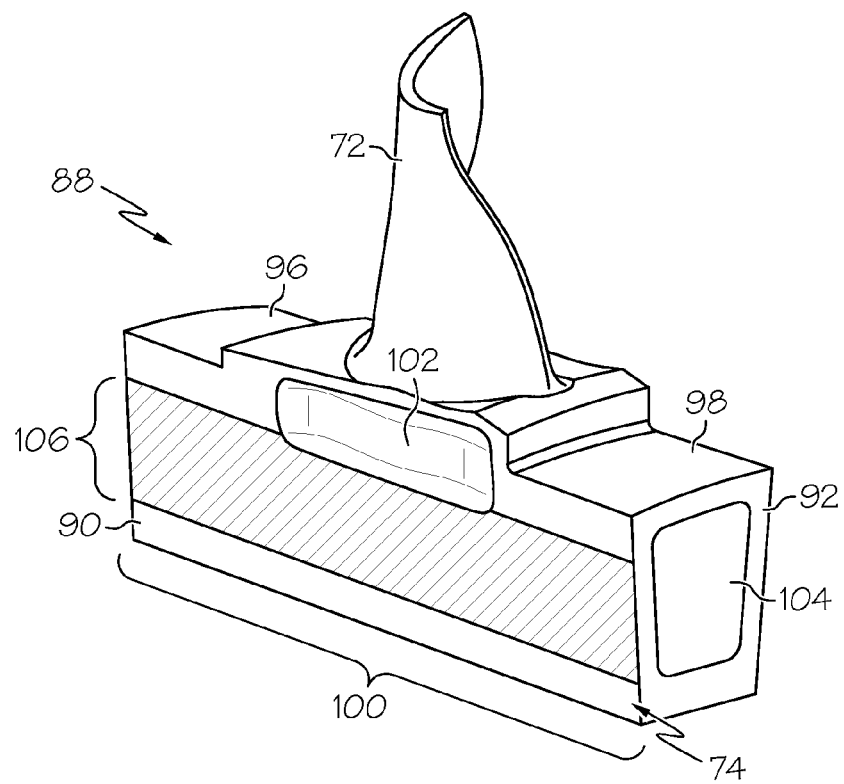
FIG. 5 is an isometric view of one of a plurality of arched pieces that may be produced or otherwise obtained during the exemplary manufacturing method shown in FIG. 4.

FIG. 5 is an isometric view of an exemplary arched piece 88 that may be produced or otherwise obtained pursuant to STEP 86 of method 84 (FIG. 4). In this particular example, arched piece 88 includes a wedge-shaped body or shank 74 and an airfoil 72 extending radially therefrom. Shank 74 has been cast or otherwise fabricated to include an outer sacrificial portion that envelops or encompasses the desired shape of the completed shank. Stated differently, shank 74 is a rough casting or preform physically embodying the finished shank, which may be subsequently defined by further machining as described below in conjunction with FIG. 14. Shank 74 includes a forward shoulder 90 and an aft shoulder 92, which extend from the central body of shank 74 in opposing axial directions. Opposing axial shoulders 92 and 94 are fabricated to include outer tooling contact surfaces 96 and 98, respectively, which are located axially adjacent the forward and aft ends of airfoil 72 and which have a gently curved or arced outer geometry. Shank 74 also includes opposing lateral faces or sidewall surfaces 100, only one of which can be seen in FIG. 4. Sidewall surfaces 100 are each angled to impart shank 74 with a wedge-shaped geometry, when viewed from the forward/leading or aft/trailing end thereof. As each sidewall surface 100 of shank 74 will ultimately be bonded to a corresponding sidewall surface of a neighboring shank, sidewall surfaces 100 are referred to herein as "shank-to-shank bonding surfaces 100." As indicated in FIG. 5, a first cavity 104 may be formed in (e.g., cast or machined into) the trailing face of aft shoulder 92; and a second cavity may likewise be formed in the leading face of forward shoulder 90 (hidden from view in FIG. 1). In addition, a sidewall pocket 102 may be formed within each bonding surface 100 immediately below the root of airfoil 72 for weight reduction purposes.

As will be described more fully below in conjunction with STEP 116 of exemplary method 84 (FIG. 4), arched pieces 88 are inter-bonded to yield the monolithic ring utilizing a metallurgical bonding process, such as diffusion bonding or brazing. In embodiments wherein arched pieces 88 are bonded by brazing alone or in combination with another bonding process, a braze material may be disposed between neighboring shanks 74. For example, and as described more fully below in conjunction with FIGS. 11-13, a braze foil may be inserted between neighboring shanks 74 prior to the below-described bonding process. To accommodate the braze foil, each arched piece 88 may be fabricated to include at least one braze foil pocket, which may be formed in one or both of sidewall surfaces 100. In a preferred embodiment, each arched piece 88 is fabricated to include a single braze foil pocket, which is formed in one of sidewall surfaces 100. For example, as indicated in FIG. 4 by cross-hatched region 106, such a braze foil pocket may be formed by cutting a relatively shallow groove or channel laterally across one sidewall surface 100.

Figure 6:
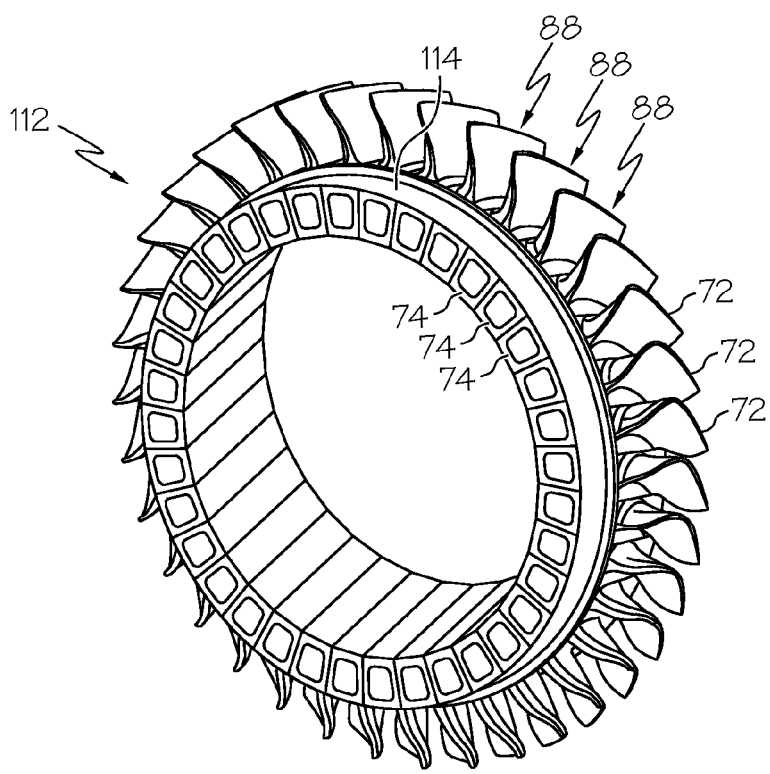
FIG. 6 is an isometric view of an airfoil ring formation into which the exemplary arched piece shown in FIG. 5 and like arched pieces may be arranged prior to consolidation into a monolithic airfoil ring via a directed thermal growth bonding process.

Continuing with exemplary method 84 (FIG. 4), a series of steps is next performed to inter-bond or consolidate the arched pieces and produce a monolithic ring (PROCESS BLOCK 108, FIG. 4). First, the arched pieces are arranged in an annular group or ring formation (STEP 110, FIG. 4), such as ring formation 112 shown in FIG. 6. When arched pieces 88 are arranged in this manner, each shank 74 is positioned between two neighboring shanks 74 (three of which are labeled in FIG. 6), and each shank-to-shank bonding surface 100 (identified in FIG. 5) is positioned adjacent a neighboring bonding surface 100. The neighboring bonding surfaces 100 may contact each other at this stage in the fabrication process or may instead be separated by a small radial gap. Outer tooling contact surfaces 96 and 98 of axially-extending shoulders 92 and 94 (FIG. 5) combine to impart ring formation 112 with forward and aft composite tooling contact surfaces 114 and 115, respectively. Composite tooling contacts surfaces 114 and 115 each have a substantially annular geometry and extend from circumferentially-spaced blades 72 of ring formation 112 in an opposing axial directions.

As previously indicated, bonding material may be disposed between neighboring shank-to-shank bonding surfaces 100 (FIG. 5) during STEP 110 of exemplary method 84 (FIG. 4) in embodiments wherein shanks 74 are bonded by brazing. In embodiments wherein pockets are formed in the shank-to-shank bonding surfaces, such as sidewall pocket 106 formed in bonding surface 100 (FIG. 5), a strip of braze foil may be inserted into each pocket. In this case, it is preferred that volume of each braze foil sheet is slightly greater than the volume of its corresponding pocket to ensure the creation of a void-free, zero-defect braze joint during the below-described directed thermal growth bonding process. In this regard, the braze foil sheet may be trimmed to have planform dimensions (e.g., a height and width) substantially equivalent to the dimensions of braze foil pockets 106 (FIG. 5), while the thickness of the braze foil sheet may be chosen to be slightly greater than the pocket depth; e.g., in one implementation wherein the pocket depth is about 0.0025 inch, the braze foil thickness may be about 0.0030 inch.

Figure 16:
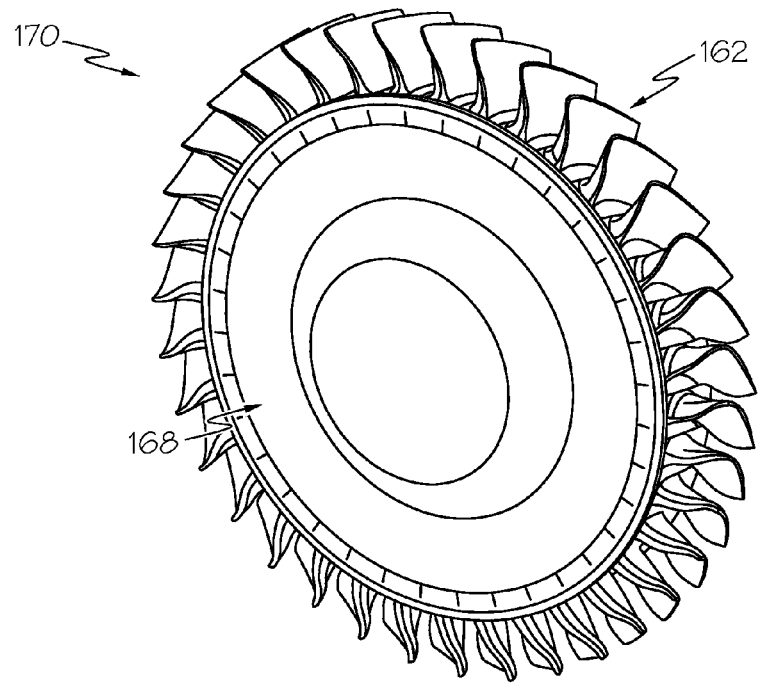

After arranging the arched pieces into ring formation 112 (FIG. 6), the arched pieces are heated to a predetermined bonding temperature or temperatures while the outward radial growth of the ring formation is constrained to promote shank-to-shank bonding (STEP 116, FIG. 4). A specialized thermal growth constraint tool is utilized to constrain or physically impede the outward radial growth of the ring formation during the directed thermal growth process. In embodiments wherein the arched pieces each include one or more airfoils (e.g., blades or vanes), it is also desirable for the tool to accommodate the airfoils during the below-described bonding process without exerting significant forces thereon that could otherwise bend, distort, or warp the airfoils. In such cases, the thermal growth constrain tool enables the inter-bonding or arch-bonding of the arcuate airfoil pieces to form a monolithic airfoil ring, which can then be bonded onto a rotor disk to produce a compressor rotor or a turbine rotor of the type described below in conjunction with FIG. 16.

Figure 7:
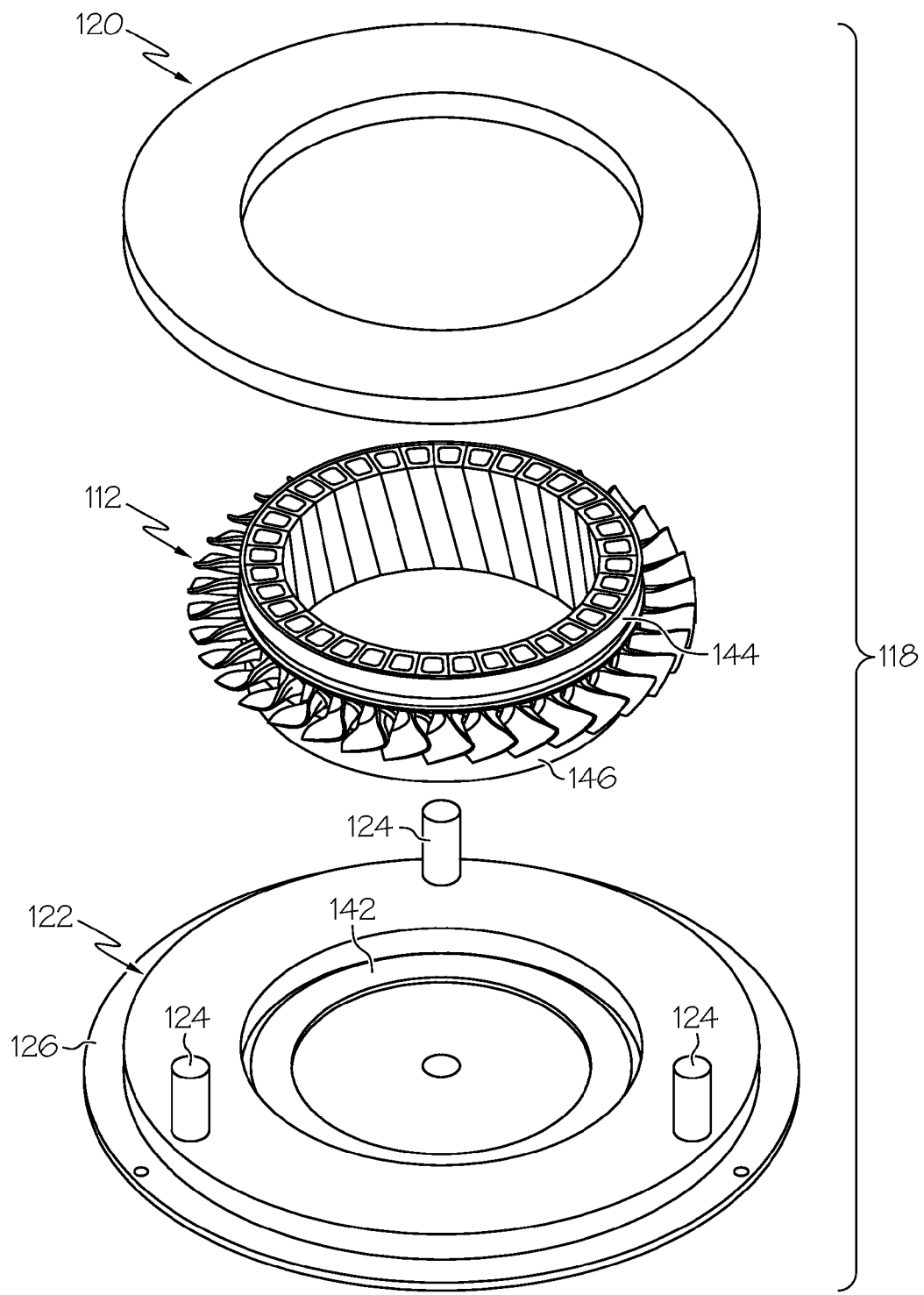
FIGS. 7 and 8 are exposed and assembled views, respectively, of a thermal growth constraint tool suitable for suitable during the directed thermal growth bonding process.
Figure 8:
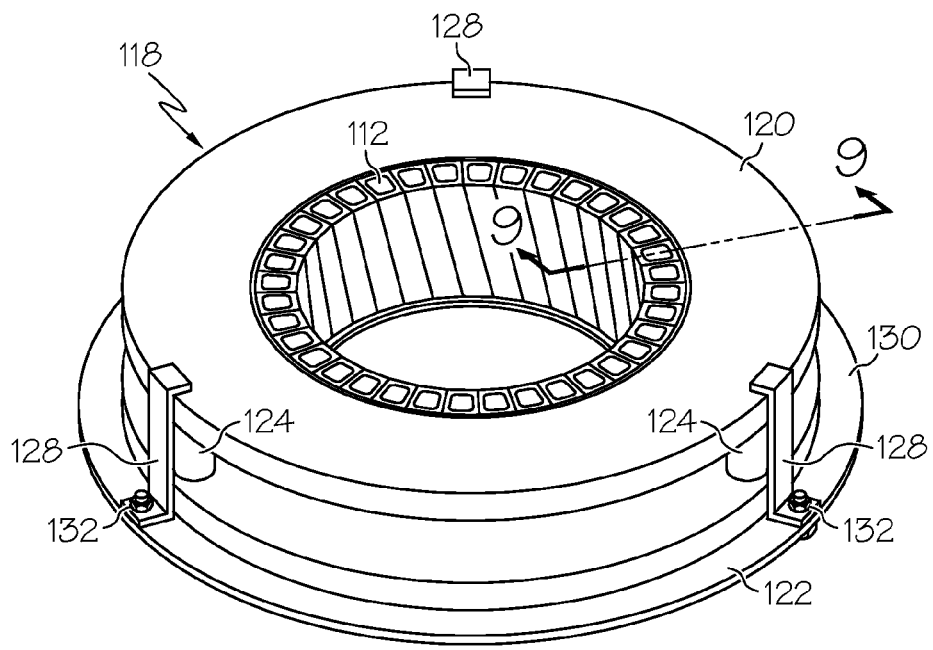

FIGS. 7 and 8 are exploded and assembled views, respectively, of a thermal growth constraint tool 118 suitable for usage in the metallurgical consolidation of ring formation 112. Thermal growth constraint tool 118 and ring formation 112 are also partially shown in FIG. 9, which is a cross-sectional view taken along line 9-9 identified in FIG. 8. In the exemplary embodiment shown in FIGS. 7-9. thermal growth constraint tool 118 includes four main components: (i) first thermal growth constraint ring 120, (ii) a second thermal growth constraint ring 122, (iii) a plurality of spacer members 124, and (iv) a baseplate 126. Constraint rings 120 and 122, spacer members 124, and baseplate 126 are sized and shaped to be assembled around ring formation 112 in a stacked formation. That is, when thermal growth constraint tool 118 is fully assembled, constraint ring 122 is positioned over and supported by baseplate 126, spacer members 124 are positioned over and supported by constraint ring 122, and constraint ring 120 is positioned over and supported spacer members 124. To retain constraint rings 120 and 122 and spacer members 124 in their desired positions after assembly of tool 118, a plurality of retainers 128 (e.g., L-shaped brackets) are affixed to an outer peripheral flange 130 providing around baseplate 126 utilizing a plurality of bolts 132 or other such fasteners (shown in FIGS. 8 and 9).

Figure 9:
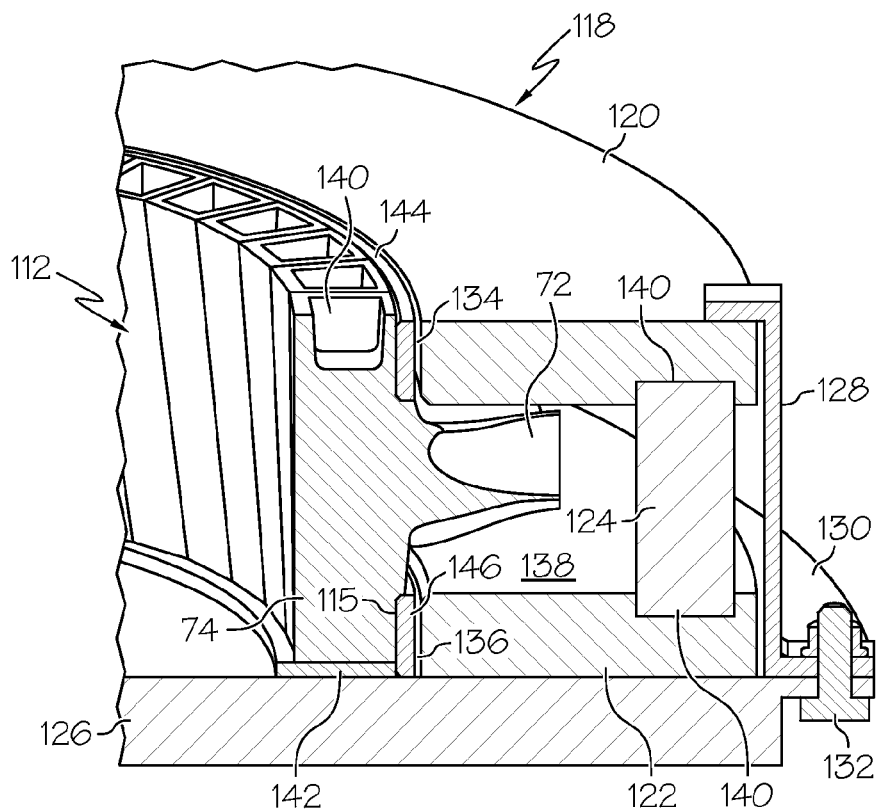
FIG. 9 is a cross-sectional view of the thermal growth constraint tool and ring formation taken along line 9-9 in FIG. 8.
Figure 10:
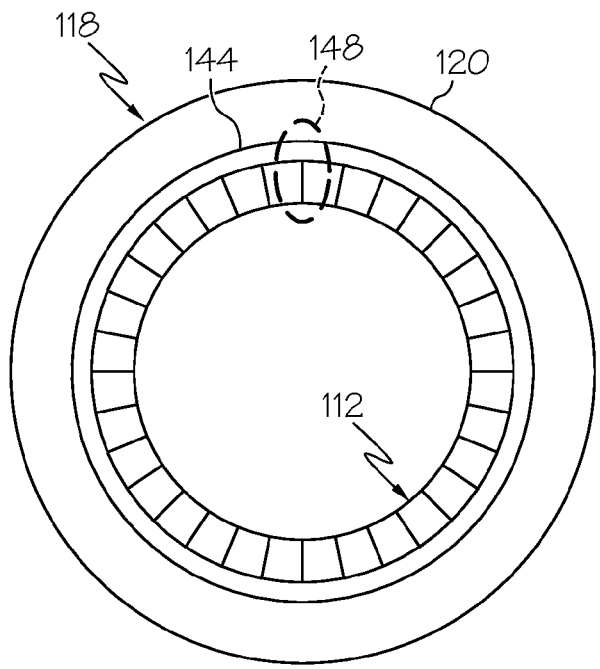
FIG. 10 schematically illustrates the thermal growth constraint tool and ring formation shown in FIGS. 7-9.

Thermal growth constraint rings 120 and 122 are shaped and sized to extend around different circumferential portions of ring formation 112 when loaded into thermal growth constraint tool 118. As shown most clearly in FIG. 9, constraint ring 120 may be fabricated to have an inner diameter that is slightly greater than the outer diameter of forward tooling contact surface 114 such that a first circumferential gap 134 is created between ring formation 112 and constraint ring 120. Similarly, constraint ring 122 may be fabricated to have an inner diameter slightly greater than the outer diameter of aft tooling contact surface 115 such that a second circumferential gap 136 is formed therebetween. A relatively large axial gap or annular void 138 (identified in FIG. 9) is further provided between the inner faces of thermal growth constraint rings 120 and 122, which are axially spaced or offset by spacer members 124 when thermal growth constraint tool 118 is assembled. As shown in FIGS. 8 and 9, blades 72 extend radially into an annular void 138 (FIG. 9) when ring formation 112 is positioned within thermal growth constraint tool 118 such that blades 72 generally reside between inner radial faces of constraint rings 120 and 122.

Spacer members 124 may assume any form suitable for maintaining the axial spacing of thermal growth constraint rings 120 and 122 during thermal processing. In the illustrated example, spacer members 124 comprise a three standoff pins, which are circumferentially spaced around the central axis of thermal growth constraint tool 118 and which extend from constraint ring 120 to constraint ring 122 when thermal growth constraint tool 118 is fully assembled. As shown in FIG. 9, the opposing ends of each stand-off pin may be received within axially-aligning cylindrical recesses 140 provided in the inner radial faces of constraint rings 120 and 122. As further illustrated in FIGS. 7-9, a support ring 142 may further be positioned between baseplate 126 and ring formation 112 to prevent fusion of ring formation 112 to baseplate 126 during thermal processing; however, the provision of such a support ring 142 may be unnecessary in alternative embodiments.

Thermal growth constraint rings 120 and 122 are fabricated to grow in a radially outward direction at a rate significantly slower than does ring formation 112 during thermal processing. To ensure a substantially uniform application of force to the forward and aft ends of ring formation 112, constraint rings 120 and 122 are also preferably fabricated to grow radially outward at substantially equivalent rates. To this end, constraint rings 120 and 122 may each fabricated from a refractory material having a coefficient of thermal expansion ("CTE") less than that of ring formation 112 and, preferably, less than approximately one half the CTE of the material from which the individual arched pieces are formed. It is also desirable for constraint rings 120 and 122 to have a sufficient high temperature strength to constrain the outward radial growth of ring formation 112, as described more fully below. Considering this, it is preferred that thermal growth constraint rings 120 and 122 are formed from a metallic material (i.e., a non-ceramic metal or alloy) having a relatively low CTE, such as molybdenum or rhenium. In one embodiment, thermal growth constraint rings 120 and 122 each comprise an annular body fabricated from molybdenum.

Spacer members 124 are preferably fabricated from a material having CTE substantially equivalent to (e.g., differing by no more than about 20% relative to) the CTE of the arched pieces from which ring formation 112 is formed. When formed from a material having a CTE similar to the CTE of arched pieces, spacer members 124 grow in axial direction at a rate substantially equivalent to ring formation 112 to maintain proper radial alignment between thermal growth constraint rings 120 and 122 and tooling contact surfaces 114 and 115, respectively. This also helps to maintaining proper axial spacing between constraint rings 120 and 122 and to prevent undesired contact between blades 72 and the inner radial faces of constraint rings 120 and 122. In one embodiment, spacer members 124 are each fabricated from the same or similar material (e.g., a nickel-based superalloy) as are the arched pieces that make-up formation 112. The CTE of spacers members 124 will also typically be greater than the CTE of constraint ringers 120 and 122.

As shown in FIGS. 7-9, a first sacrificial crush ring 144 may be disposed around a first circumference of ring formation 112 and between tooling contact surface 114 and constraint ring 120; and a second sacrificial crush ring 146 may be disposed around a second circumference of ring formation 112 and between tooling contact surface 115 and constraint ring 122. Crush rings 144 and 146 are advantageously fabricated from a material that softens and plastically deforms during the thermal processing. In this manner, the material from which crush rings 144 and 146 are formed can flow or deform to accommodate misalignment between the arched pieces and geometric imperfections in tooling contact surfaces 114 and 115 and thereby ensure that a substantially uniform load is applied to ring formation 112 during thermal bonding. In addition to softening at the thermal processing temperatures, the material from which crush rings 144 and 146 also preferably has a CTE similar to the material from which the arched pieces are fabricated to allow crush rings 144 and 146 to grow radially outward in conjunction with ring formation 112. Finally, it also desirable for the crush ring material to be relatively low cost in view of the consumable or sacrificial nature of crush rings 144 and 146. In one implementation, crush rings 144 are each fabricated from a low carbon or other low alloy steel, such as an AISI 1010 or 1020 steel.

Figure 11:
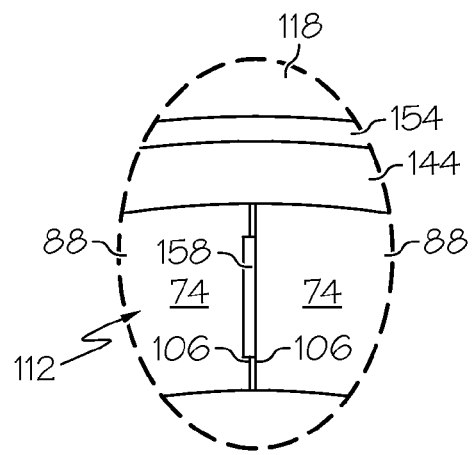
FIGS. 11-13 are detailed views of a portion of the thermal growth constraint tool and ring formation shown in FIG. 10 illustrating one manner in which the outward radial growth of the ring formation may be impeded by the constraint tool during the directed thermal growth bonding process.
Figure 12:
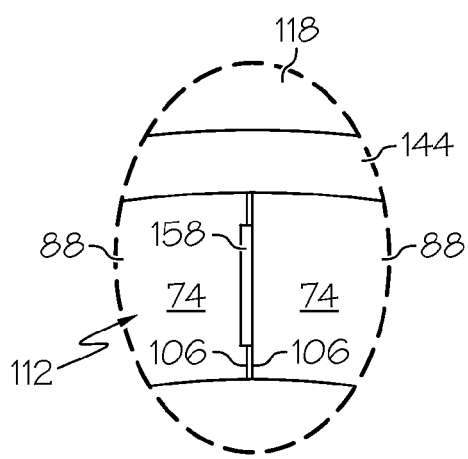
Figure 13:
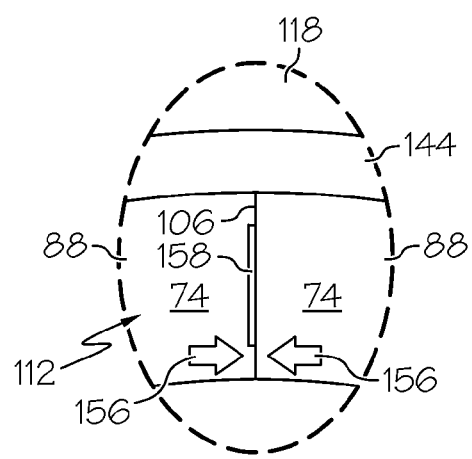

FIGS. 10-13 generically illustrate the manner in which thermal growth constraint tool 118, and specifically thermal growth constraint rings 120 and 122, impede the outward radial growth of ring formation 112 during the directed thermal growth bonding process. Only the forward face of ring formation 112 and constraint ring 120 is shown in FIGS. 10-13 and described below for clarity. However, it will be appreciated that the trailing or aft end of ring formation 112 and constraint ring 122 behave in essentially the same manner; consequently, the following description applies equally thereto. With reference to FIG. 11, which is a detailed view of the region of ring formation 112 encompassed by dashed circle 148 (FIG. 10), the outer circumferential surface of crush ring 144 may be separated from the inner circumferential surface of constraint ring 120 by a small radial gap 154 prior to heating. As ring formation 112 and thermal growth constraint tool 118 are heated to the desired bonding temperature, ring formation 112 grows in a radially outward direction such that the outer circumference of formation 112 gradually increases. In embodiments wherein crush ring 144 is formed from a material having a CTE similar or identical to that of ring formation 112, crush ring 144 likewise grows radially outward in conjunction with ring formation 112. Constraint ring 120 grows radially outward at a more gradual rate than does ring formation 112 and crush ring 144; consequently, radial gap 134 eventually closes and crush ring 144 comes into to contact with constraint ring 120 (shown in FIG. 12). At this point, further outward radial growth of ring formation 112 and crush ring 144 is impeded or physically obstructed by constraint ring 120. Further growth of ring formation 112 consequently results in the application of a significant convergent pressure urging shanks 74 together, as represented in FIG. 13 by arrows 156. A strong metallurgical bond is formed between neighboring shanks 74 as a result of this combination of a high temperature and high convergent pressures. The bond between neighboring shanks 74 may be created by melting (and the subsequent re-solidification) of a braze material disposed between shanks 74, by diffusion bonding, or by a combination thereof.

As noted above, and as generically illustrated in FIGS. 11-13 at 158, a strip or strip of braze foil may be disposed between neighboring shank bonding surfaces to promote bonding during STEP 116 of exemplary method 84 (FIG. 4). In this event, the bonding temperature or temperatures to which ring formation 112 and thermal growth constraint tool 118 are heated during STEP 116 (FIG. 4) will typically be selected to exceed the melt point of braze alloy material, while being less than the melt point of the other components included within tooling 118 and ring formation 112. Conversely, in embodiments wherein a braze foil or other bonding material is not be disposed between neighboring shanks, the bonding temperatures and components dimensions are selected to create sufficient convergent pressures to ensure the creation of a diffusion bond between neighboring shanks. In many cases, both a braze joint and a diffusion bond may be created between neighboring shanks during the above-described directed thermal growth bonding process. By way of non-limiting example, ring formation 112 and thermal growth constraint tool 118 may be heated to temperature approaching or exceeding about 2150° Fahrenheit during the above-described bonding process.

Figure 14:
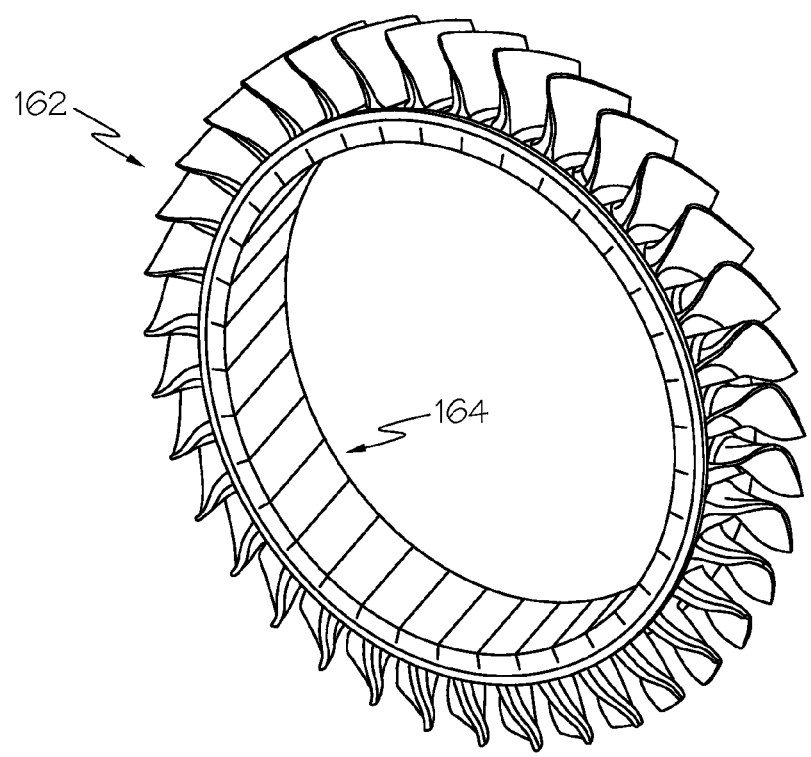
FIG. 14 is an isometric view of a monolithic airfoil ring produced by consolidation of the ring formation shown in FIGS. 7-13 and subsequent machining, as illustrated in accordance with an exemplarily embodiment.

After formation of the monolithic ring (BLOCK 110, FIG. 4), additional processing steps may next be performed (BLOCK 157, FIG. 4). For example, as indicated at STEP 160 in exemplary method 84 (FIG. 4), the monolithic ring may be bonded to a rotor disk in embodiments wherein method 84 is utilized to produce a compressor rotor or a turbine rotor, such as turbine rotor 60 shown in FIGS. 2 and 3. During STEP 160 (FIG. 4), the interior of the monolithic ring may be machined to generally conform with a separately-fabricated rotor disk, such as rotor disc 168 described below in conjunction with FIG. 16. FIG. 14 is an isometric view of a monolithic ring 162 that may be produced pursuant to the above-descried steps and having a machined inner annular region 164. As may be appreciated by comparing FIG. 14 to FIG. 6, the bulk or the entirety of the tooling contact surfaces of the now-bound arched pieces has been removed. Machining of monolithic ring 162 also improves surface finish to facilitate bonding during the below-described ring-to-disk bonding process.

Figure 15:
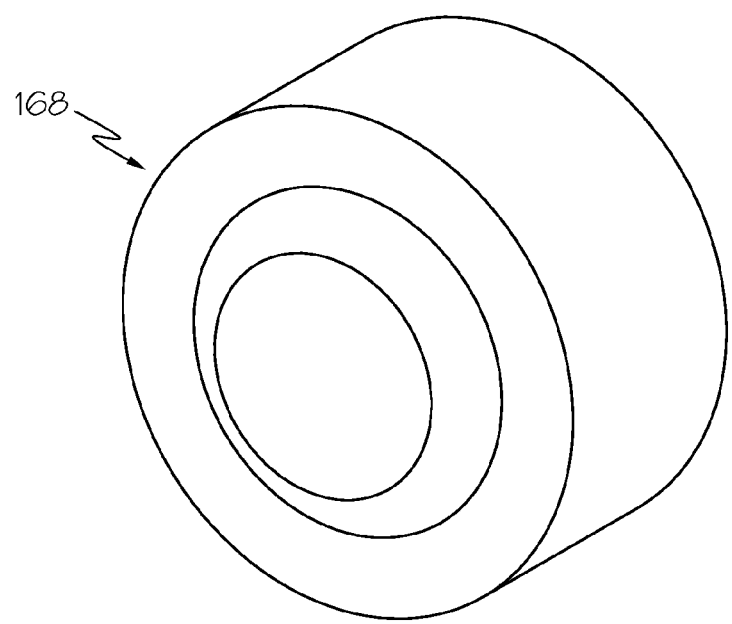
FIGS. 15 and 16 are isometric views of a machined disk forging prior to and after joinder to the machined monolithic airfoil ring shown in FIG. 14, respectively.

During STEP 160 of exemplary method 84 (FIG. 4), a rotor disk is produced by, for example, forging and subsequent machining FIG. 15 is an isometric view of an exemplary rotor disk 168 that may be produced during STEP 160. Rotor disk 168 is preferably fabricated from an alloy tailored to the unique operational environment of the rotor disk; e.g., an alloy having relatively high stress rupture and life cycle fatigue properties. In one implementation, rotor disk 168 is fabricated from an oxidation-resistant, nickel-based superalloy; while monolithic ring 162 is fabricated from a single crystal superalloy of the type described above. After production of the rotor disk forging, the outer annular portion of rotor disk 168 may be machined to impart disk 168 with a desired surface finish and an outer diameter approximately equivalent to the inner diameter of machined airfoil ring 162. Machined monolithic ring 162 is then fit onto machined rotor disk 168. The leading and trailing annular interfaces between the outer circumference of ring 162 and the inner circumference of disk 168 are sealed by, for example, brazing to prevent the ingress of air into the ring-disk interface that may otherwise interfere bonding. A HIP diffusion bonding process or other directed thermal growth bonding process is then carried-out to bond monolithic ring 162 to rotor disk 168 and thereby yield a metallurgically-bonded turbine rotor, such as turbine rotor 170 shown in FIG. 16.

After bonding airfoil ring 162 to rotor disk 168, additional processing steps may then be performed to complete fabrication of the metallurgically-consolidated turbine engine component. In the exemplary case of turbine rotor 60 (FIGS. 2 and 3), and as indicated in FIG. 4 at STEP 172, a wire electrical discharge machining process or other material removal process may be utilized to create strain relief features within rotor disk 168, such as inter-blade cut-outs 78 shown in FIGS. 2 and 3. Any braze material or other bonding material, if utilized to inter-bond the arched pieces during the above-described consolidation process, may be removed during this final processing step to prevent gradual diffusion of these materials into the airfoil structure during operation within a high temperature gas turbine engine environment. Turbine rotor 60 may then be inspected for structural defects utilizing any one of a number of known non-destructive inspection techniques. Finally, as indicated in FIG. 4 at STEP 174, turbine rotor 60 may be installed within a gas turbine engine.

In the above-described exemplary embodiment, a thermal growth constraint tool was utilized to impede the outward radial growth of a ring formation and, thus, force convergent growth and inter-bonding of the arched pieces due high convergent pressures and process temperatures, either alone or in combination with the melting of a braze material. As described above, the thermal growth constraint tool advantageously includes one or more thermal growth constraint members having a relatively coefficient of thermal expansion as compared to the ring formation, which impede the outward radial growth of the ring formation during thermal bonding. This example notwithstanding, it should be understood that any tool that can assembled around or otherwise positioned around the ring formation having a thermal growth rate less than that of the ring formation, as taken in a radial direction during the directed thermal growth bonding process, can be utilized. In certain embodiments, the thermal growth constraint tool may not include components having coefficients of thermal expansion less than of ring formation and may, instead, be actively cooled during the directed thermal growth bonding process. With this understood, the thermal growth constraint tool preferably includes at least one thermal growth constraint member having a CTE less than that of the ring formation (e.g., first and second thermal growth constraint rings of the type described above) to minimize part count, cost, and complexity.

Figure 17:
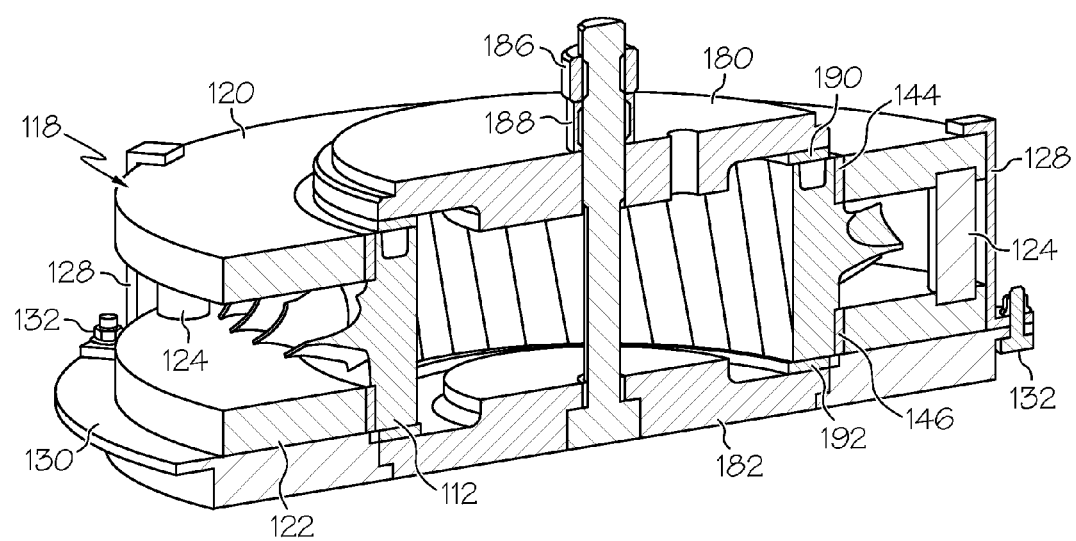
FIG. 17 is a cross-sectional view of an alternative embodiment of the thermal growth constraint tool shown in FIGS. 7-9 illustrated in accordance with a further exemplary embodiment of the present invention.

The thermal growth constraint tool may also include one or more components inserted into the central opening of the ring formation to impart an initial preload on the ring formation in a radially outward direction and/or to maintain alignment of the arched pieces during the directed thermal growth bonding process. For example, as shown in cross-section in FIG. 17, an alternative embodiment of thermal growth constraint tool 118 may include first and second central endplates 180 and 182, which are clamped over ring formation 112 and against the opposing shank faces utilizing, for example, a bolt 184 and nut 186. Bolt 184 may be fabricated from a material having a relatively low coefficient of thermal expansion (e.g., molybdenum) to exert an axial clamping force on ring formation 112 during thermal bonding and thereby prevent misalignment between neighboring arched pieces in embodiments wherein the shank-to-shank mating surfaces are angled (i.e., non-parallel with the axis of ring formation 112). A crush ring 188 may be disposed between nut 186 and endplate 180 to yield as ring formation grows outward in axial directions. As further indicated in FIG. 17, spacer rings 190 and 192 may be positioned between endplates 180 and 182 and ring formation 112 to prevent undesired bonding therebetween during thermal processing.

The foregoing has thus provided embodiments of a method for the manufacture of a metallurgically-consolidated turbine engine component, such as turbine rotor, wherein a unitary or monolithic ring of blades (or other airfoils) is produced in a manner that enables the ring of blades to be fabricated from a single crystal material, at least in some embodiments, that increases product yield, and that allows for relatively complex geometries and features to be cast in or otherwise formed in the ring of blades. In addition, relative to turbine rotors produced utilizing individually-inserted blades (e.g., a fir tree interface), turbine rotors produced in accordance with the above-described exemplary embodiment to reduce mechanical stressors at the disk, to reduce production costs, and to reduce leakage thereby improving specific fuel consumption and other measures of engine performance. The foregoing has also provided embodiments of a thermal growth constraint tool suitable for usage in method for manufacture metallurgically-consolidated turbine engine component, such as a turbine rotor.

While primarily described above in the fabrication of a bladed monolithic ring from a plurality of bladed pieces having a specific geometry, it is emphasized that embodiments of the fabrication described herein can be utilized to inter-bond various different types of arched pieces, whether such pieces do or do not include one or more blades or vanes, to yield a monolithic structure. In embodiments wherein the arched pieces each include one or more blades or vanes, the arched pieces may be referred to as "arched airfoil pieces" and may be metallurgically consolidated or arch-bound utilizing the above-described process to produce a bladed turbine rotor, a bladed compressor rotor, or a turbine nozzle. For example, in certain embodiments, the fabrication process can be utilized to inter-bond a plurality of arched pieces each having one or more vanes to produce a monolithic turbine nozzle ring. In this case, each arched piece may be integrally cast with an outer endwall or shroud and subsequently bi-cast with the inner endwall or shroud. In still further embodiments wherein the arched pieces do not include one or more airfoils, the arched pieces may be metallurgically consolidated to produce an annular frame member, a seal plate, or another annular component utilized within a gas turbine engine.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A method for producing a turbine engine component, comprising:
   obtaining a plurality of arched pieces;
   arranging the plurality of arched pieces in a ring formation; and
   bonding the plurality of arched pieces together to produce a monolithic ring by heating the ring formation to a predetermined bonding temperature while constraining the outward radial growth thereof, the step of bonding comprising:
   positioning a thermal growth constraint ring around the ring formation; and
   heating the ring formation to a predetermined bonding temperature at which the ring formation grows into the thermal growth constraint ring.

2. A method according to claim 1 wherein the thermal growth constraint ring has a coefficient of thermal expansion less than that of the ring formation.

3. A method according to claim 2 further comprising positioning a sacrificial crush ring between the ring formation and the thermal growth constraint ring prior to the step of heating.

4. A method according to claim 2 further comprising the step of disposing braze material between the plurality of arched pieces prior to the step of heating, and wherein the step of heating comprises heating the ring formation to a predetermined bonding temperature exceeding the melt point of the braze material.

5. A method according to claim 4 wherein the step of disposing comprises disposing at least one strip of braze foil between each pair of neighboring arched pieces prior to the step of heating.

6. A method according to claim 1 wherein the step of obtaining comprises obtaining a plurality of arched pieces, each comprising:
   a shank; and
   an airfoil extending radially from the shank.

7. A method according to claim 6 wherein the step of arranging comprises arranging the plurality of arched pieces in a ring formation such that each shank is positioned between two neighboring shanks and the airfoils are circumferentially-spaced about the ring formation.

8. A method according to claim 7 wherein the step of bonding comprising:
   assembling a thermal growth constraint tool around the ring formation; and
   bonding the plurality of arched pieces together to produce a monolithic airfoil ring by heating the ring formation to a predetermined bonding temperature at which the ring formation grows into the thermal growth constraint tool.

9. A method according to claim 8 wherein the thermal growth constraint tool comprises an annual void, and wherein the step of assembling comprises assembling the thermal growth constraint tool around the ring formation such that the airfoils extend into the annular void.

10. A method according to claim 5 wherein the step of bonding comprises:
    inserting strips of braze foil between neighboring shanks prior to the step of bonding; and
    bonding the plurality of airfoils together to produce a monolithic ring by heating the ring formation to a temperature exceeding the melt point of the strips of braze foil while constraining the outward radial growth thereof.

11. A method according to claim 10 wherein the step of obtaining comprises fabricating the plurality of arched pieces to each include a braze foil pocket formed in its shank, and wherein the step of inserting comprises inserting strips of braze foil between neighboring shanks and into the braze foil pockets prior to the step of bonding.

12. A method according to claim 11 wherein the step of fabricating comprises fabricating each braze foil pockets to have a depth less than the thickness of the sheets of braze foil.

13. A method according to claim 1 further comprising the steps of:
   fitting a disk member within the monolithic ring;
   sealing the interface between the disk member and the monolithic ring; and
   subjecting the disk member and the monolithic ring to a hot isostatic press process after sealing to bond the disk member to the monolithic ring.

14. A method for manufacturing a turbine engine component, comprising:
   producing a plurality of arched pieces, each comprising:
      a shank; and
      an airfoil extending radially from the shank; and
   after producing the plurality of arched pieces to each include a shank and an airfoil extending radially therefrom, bonding the plurality of arched pieces together to form a monolithic airfoil ring, the step of bonding comprising:
      arranging the plurality of arched pieces in a ring formation such that each shank is positioned between two neighboring shanks;
      disposing a thermal growth constraint tool around the ring formation; and
      heating the plurality of arched pieces to a predetermined temperature at which outward radial growth of the ring formation is impeded by the thermal growth constraint tool to urge the neighboring shanks together and promote the bonding thereof.

15. A method for manufacturing a turbine engine component, comprising:
   producing a plurality of arched pieces, each comprising:
      a shank; and
      an airfoil extending radially from the shank; and
   bonding the plurality of arched pieces together to form a monolithic airfoil ring, the step of bonding comprising:
      arranging the plurality of arched pieces in a ring formation such that each shank is positioned between two neighboring shanks;
      disposing a thermal growth constraint tool around the ring formation; and
      heating the plurality of arched pieces to a predetermined temperature at which outward radial growth of the ring formation is impeded by the thermal growth constraint tool to urge the neighboring shanks together and promote the bonding thereof;
   wherein the thermal growth constraint tool comprises first and second thermal growth constraint rings each having a coefficient of thermal expansion less than that of the ring formation, and wherein the step of disposing comprises positioning the first and second thermal growth constraint rings around the ring formation.

16. A method according to claim 15 wherein the step of positioning comprises assembling the thermal growth constraint tool around the ring formation such that the first and second thermal growth constraint rings are axially spaced by at least one spacer member having a coefficient of thermal expansion less than that of the first and second thermal growth constraint rings.

17. A method according to claim 16 wherein each of the plurality of arced pieces comprises opposing axial shoulders, and wherein the step of arranging comprises arranging the plurality of arched pieces in a ring formation having first and second annular tooling contact surfaces generally defined by the opposing axial shoulders of the plurality of arched pieces.

18. A method according to claim 17 wherein the step of disposing a thermal comprises assembling the thermal growth constraint tool around the ring formation such that the first and second thermal growth constraint rings extend around the first and second annular tooling contact surfaces, respectively.

19. A method according to claim 14 further comprising the step of disposing braze material between neighboring shanks of the plurality of arched pieces prior to the step of heating, and wherein the step of heating comprises heating the ring formation to a predetermined bonding temperature exceeding the melt point of the braze material.

20. A method according to claim 19 further comprising forming a braze pocket in at least one of the shanks of the plurality of arched pieces, and wherein the step of disposing comprises positioning at least one strip of braze foil in the braze foil pocket prior to the step of heating.

* * * * *